(12) United States Patent (10) Patent No.: US 8,352,599 B1
Frisbie et al. (45) Date of Patent: Jan. 8, 2013

(54) METHOD AND COMPUTER PROGRAM FOR MANAGING CLIENT TASK INFORMATION WITH MULTIPLE USERS

(75) Inventors: James V Frisbie, Omaha, NE (US); David Archbold, Missouri Valley, IA (US)

(73) Assignee: West Corporation, Omaha, NE (US)

( * ) Notice: Subject to any disclaimer, the term of this patent is extended or adjusted under 35 U.S.C. 154(b) by 1197 days.

(21) Appl. No.: 12/181,393

(22) Filed: Jul. 29, 2008

(51) Int. Cl.
*G06F 13/00* (2006.01)
(52) U.S. Cl. ....................................................... 709/225
(58) Field of Classification Search .................. 709/225
See application file for complete search history.

(56) References Cited

U.S. PATENT DOCUMENTS

2004/0122736 A1* 6/2004 Strock et al. ................. 705/14

* cited by examiner

*Primary Examiner* — Robert B Harrell (57) ABSTRACT

A method and computer program for managing client task information across a network with multiple users. The method and computer program is designed to be flexible by providing a standard set of tools for account managers while allowing customization of those tools. The method and computer program includes creating one or more classes associated to a client, creating one or more programs associated to a client's promotion, setting lists of tasks to be completed for a promotion, alerting users when a task is not completed by a given time, creating and storing template documents for a promotion, creating directories of file storage units, uploading electronic documents to the file storage units; inputting contact information into a class or program; providing levels of access to the client task information based on the user.

23 Claims, 9 Drawing Sheets

METHOD AND COMPUTER PROGRAM FOR MANAGING CLIENT TASK INFORMATION WITH MULTIPLE USERS

BACKGROUND OF THE INVENTION

1. Field of the Invention

The present invention relates to network-based informational storage and management systems and more particularly to a computer program and method for managing client task information across a network.

2. Discussion of the Background

The storage and management of documents and information in business presents a large challenge as the amount of information and number of people needing access to the data grows. However, in the current technology era, advances in digital information technology have reduced the burden of paper managed information.

Information technology has an infinite number of solutions and setups tailored to different types of businesses requiring varied data organization. The embodied invention presents an information management solution with a hierarchical design available to multiple users across a network. While this design may be applicable to various businesses, its initial purpose was to simplify the task information management for banking applications. Banks needed a solution for front-line account managers to allow them to perform their daily tasks while cutting down on redundancy and error. The designed solution allows banking account managers with the ability to organize their digital data by clients and further by promotions, while providing a set of customizable tools. The solution also allows account managers to track the setup of their promotions through online checklists. The present invention is particularly advantageous in a bank where a group of account managers support common clients where shared access to client data is needed.

SUMMARY OF INVENTION

The present invention is a client information task management system that provides a central repository to store client information and documents. It also serves as a collaborative tool for storing client information and documents.

Class and Program Hierarchy

The present invention organizes information into a hierarchical two-tiered system. As such, the invention is flexible enough to act as an information management solution for any set of information divisible into two tiers. The set of information is divided initially into one or more classes. Each class is divided further into one or more programs. As applied to banking, classes represent account managers' clients while programs represent the numerous promotions and programs setup for clients. The hierarchy allows for a logical organization of files, contact information, tasks, document templates, customizable tools, and other information. Further, the hierarchy allows administrators to easily restrict access to certain clients' information by users. The administrator can setup the system so that only managers dealing with a client will have access to that client's data.

Task Lists and Alerts

Within a program, users of the present invention can configure fully customizable checklists for start up and closing of programs. Further, timed alerts can be configured for each checklist item to remind managers of when the task needs to be completed. These alerts can also be added to Microsoft Outlook.

Program File Repository

The present invention includes a central data store or program file repository that allows for all documentation to be saved electronically. This documentation includes any client or program relevant information including scanned paperwork, emails, contracts, and template documents. Within the repository, a user can setup file storage units based on the types of correspondence. The repository is essential to the system's ability to reduce the burden of paper management within a business.

One type of document stored in the repository, template documents interface with the program to eliminate the amount of information that must be entered. When a user opens a template from within a program, the template is filled out with the class and program information pre-populated.

Types of Users

Access to the information stored in the system is restricted by user profiles. Two types of administrators are responsible for customizing and maintaining the application for their designated client base. The Global Administrators possess administrative access through the entire system allowing them to view and modify all parts of the system. The Global Administrators are tasked with the responsibility of restricting other users' access. The Class Administrators possess administrative access with a specific class. Administrators can setup users as Normal Users who possess the ability to create and modify programs, complete checklist items, create and update documents, and add items to the file repository. This group of users might include Account Managers and Associate Account Managers. Administrators can further restrict access to the system by assigning View-only privileges to a user. View-only Users possess the ability to view the aspects of a program, but cannot modify the program. This group of users might include support specialists.

Encryption

The present invention provides the additional ability to interface with a PGP (Pretty Good Protection) encryption and decryption key ring for sending information securely between account managers and clients. Encrypted communication provides the security necessary for exchanging information with this network-based system.

In one embodiment, a computer program embodied in a computer readable medium for managing client task information with one or more users comprises a first computer code for creating one or more classes associated to a client, wherein each class comprises one or more programs, a second computer code for creating one or more checklists for each program, wherein each checklist comprises one or more tasks.

In another embodiment, a computer program embodied in a computer readable medium for managing client task information across a network with one or more users, the computer program comprising a first computer code for creating one or more classes associated to a client, wherein each class comprises one or more programs associated to the client's promotion, a second computer code for setting lists of tasks to be completed for the program, a third computer code for alerting one or more users when the task is not completed by a given time, a fourth computer code for creating and storing template documents for the program, a fifth computer code for creating directories of file storage units for the program, wherein each unit holds electronic documents, a sixth computer code for inputting contact information into the program, and a seventh computer code for restricting users to levels of access to the computer program.

In a further embodiment, a method for managing client task information across a network with one or more users, the method comprising: creating one or more classes associated to a client; creating one or more programs associated to a client's promotion; setting lists of tasks to be completed for the program; alerting one or more users when a task is not completed by a given time; creating and storing template documents for the program; creating directories of file storage units for the program; uploading at least one electronic document to at least one file storage unit; inputting contact information into the class; and providing levels of access to the computer program for one or more users.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Referring now to the drawings, wherein like reference numerals designate identical or corresponding parts throughout the several views, preferred embodiments of the present invention are described.

Figure 1:
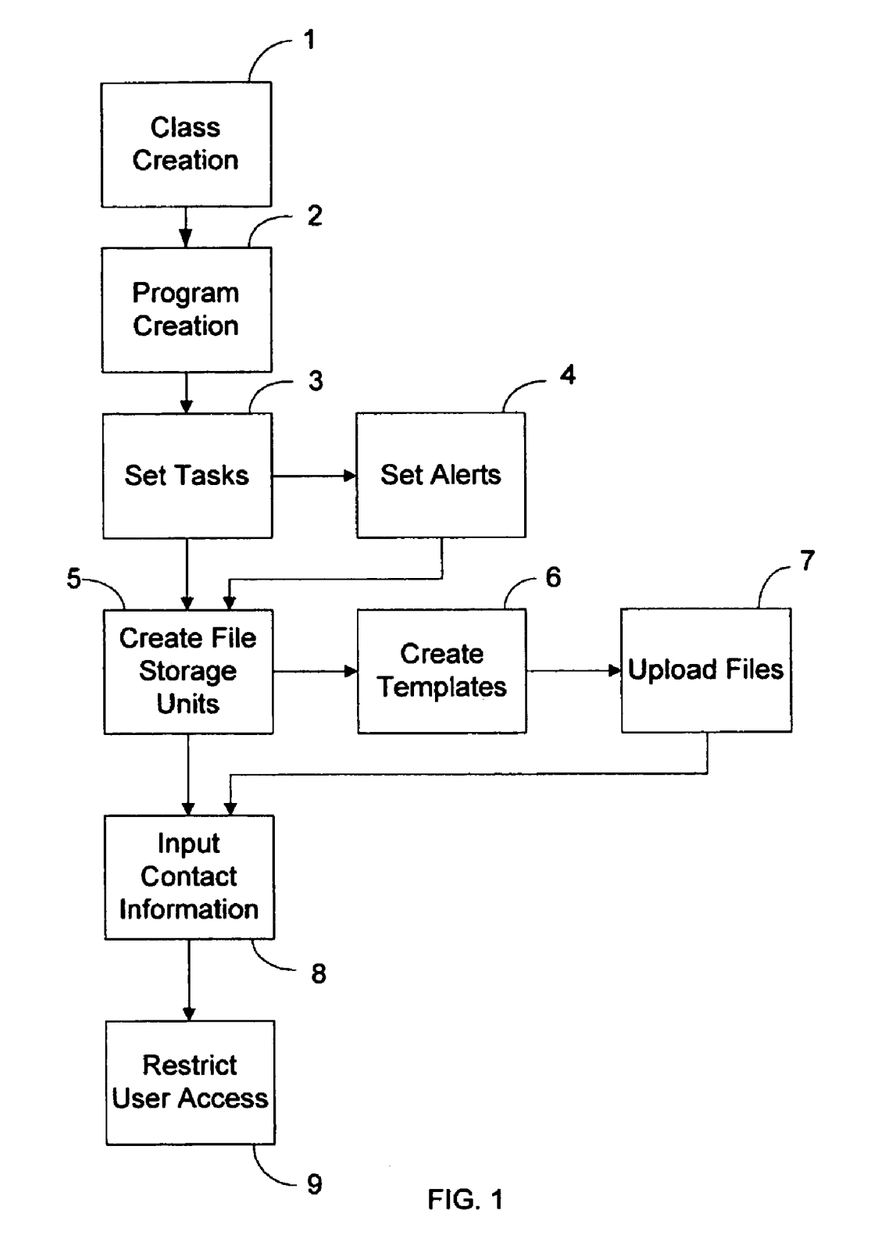
FIG. 1. is a flow chart illustrating a method for managing client task information in accordance with a preferred embodiment of the present invention.

Referring to FIG. 1, a simplified flow chart illustrating the steps involved in creating a task information management system according to an embodiment of the present invention is shown. The method illustrated involves setting up the main components of the system. As shown at block 1, the method begins by creating one or more classes, which act as organizational containers for the system. The system is further organized by creating one or more programs for each class in the second step 2.

As shown at blocks 3 and 4, task lists are created for each program detailing the tasks needing to be completed. Alerts may be setup for each task to notify users when tasks are not completed on time or are nearing the desired completion date. Each program may have predefined required tasks as well as customizable tasks added by users. Once the user has created tasks and optionally created alerts, the user creates a program file repository, as shown at block 5, for storing various types of files. From block 5, the user may choose to create template documents and upload files at blocks 6 and 7 or move on to inputting contact information relating to a particular class or program at block 8. The final step in the method, shown at block 9, involves setting up types of users in order to restrict access to the information stored in the system. The four types of users that may be created are Global Administrators, Class Administrators, Normal Users, and View-Only Users.

Figure 2:
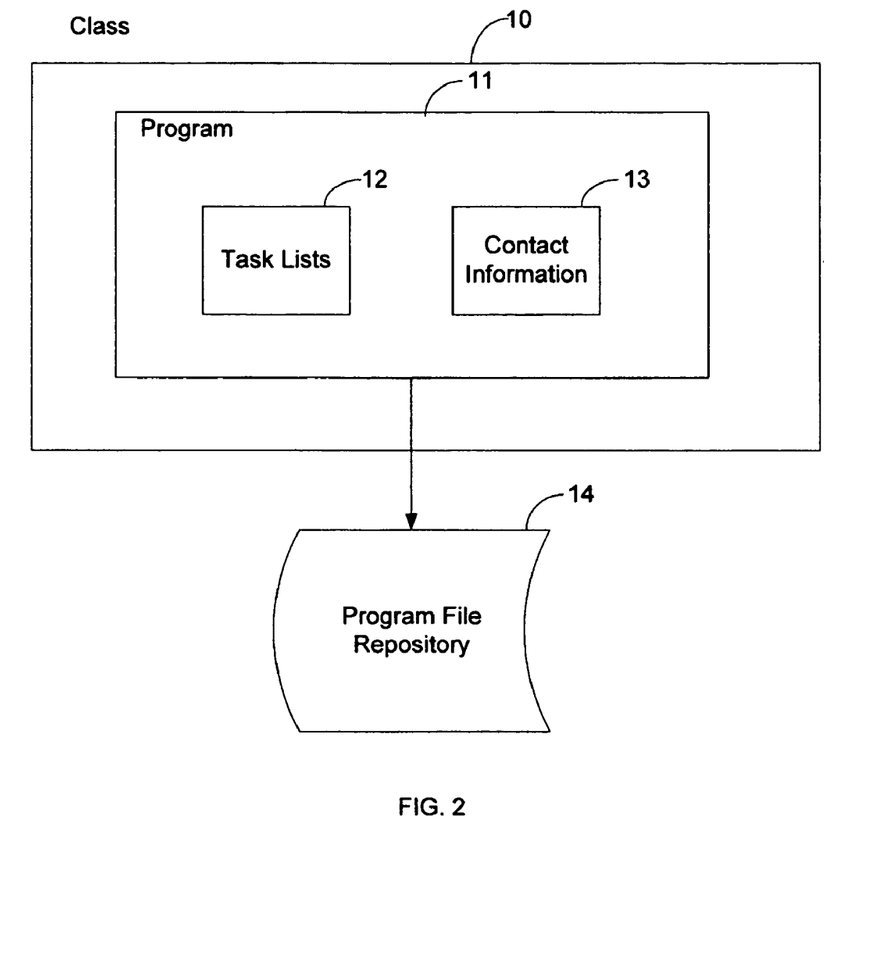
FIG. 2. is a diagram illustrating the hierarchical elements in accordance with a preferred embodiment of the present invention.

Referring to FIG. 2, a top-level diagram outlining the two-tier hierarchical design according to an embodiment of the present invention is shown. The diagram is not meant to show the entire task information management system, but rather a simplified system with a single class 10, a single program 11, and the components contained therein. The present invention involves the creation of a hierarchical system of containers, in which the class 10 is the first tier of organization. For example in a real-world banking account management application, the class 10 may represent an individual client. The system is further organized into one or more programs 11, which might represent a client's promotion in the same banking application. The two-tier hierarchical organization is flexible, fitting any application that can be divided into two subdivisions. Within the program 11, informational components are created including a set of task lists 12 and contact information 13. Further information related to the program 11 is stored in the Program File Repository 14 and linked to from the program. Information stored in the Program File Repository 14 includes, but is not limited to, emails, scanned documents, template documents, and contracts.

Figure 3:
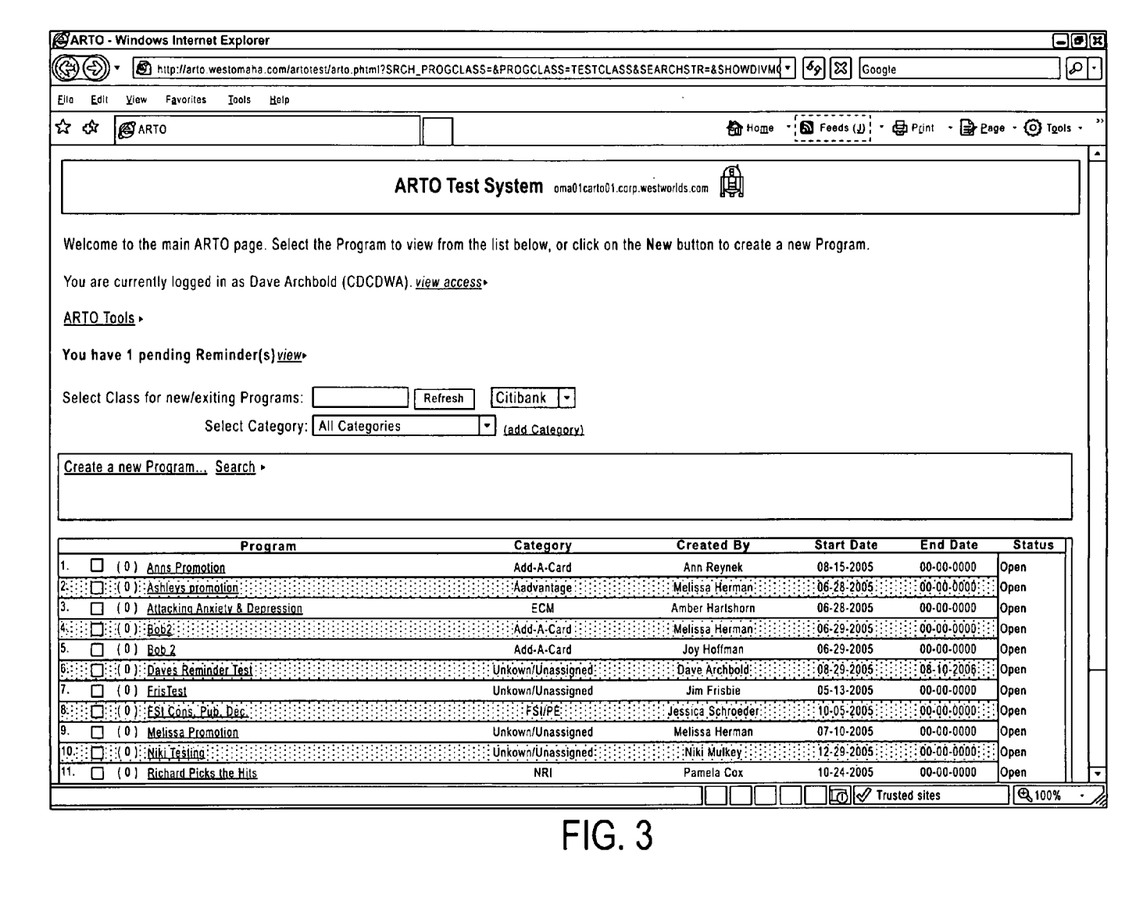
FIG. 3. is a screenshot of the main page of the user interface in accordance with a preferred embodiment of the present invention.

Referring to FIG. 3, the initial page of the user interface according to an embodiment of the present invention is shown. The user interface provides users with a graphical representation of the information stored in the system for easy navigation. The screenshot shows that the pages of the user interface are accessed through a URL and are therefore available to users across a network. The main page provides the user with a list of previously created programs which can be viewed by class, each of which has a link to its program page that can be viewed for further information. The main page also provides a link for the user to create a new program.

Referring to FIGS. 4-9, the content pages of the user interface according to an embodiment of the present invention is shown. Each page has a common toolbar at the top of the page allowing users to easily navigate through the content pages. The program info tab provides users with links to the program information pages. The checklists tab provides users with links to the content pages for creating and modifying checklists. The documents tab provides users with links to access the program file repository and the files and templates stored therein.

Figure 4:
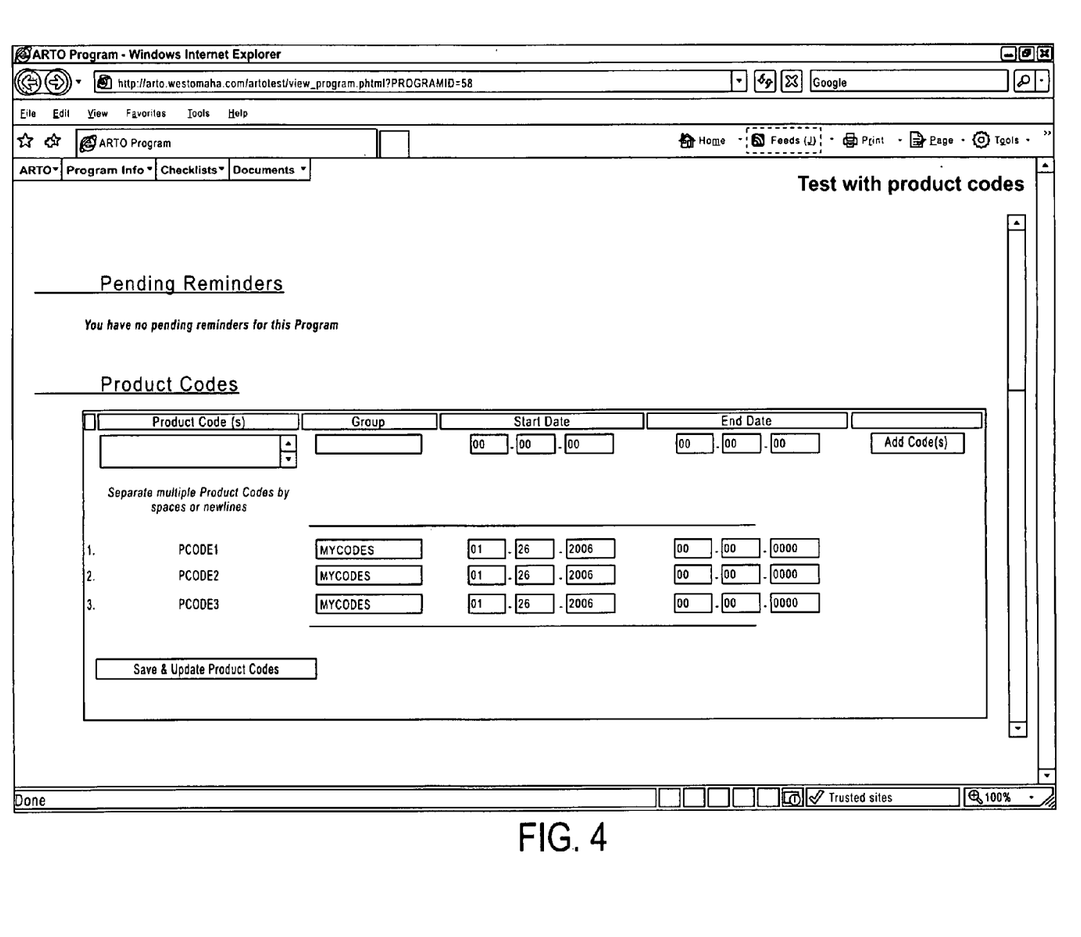
FIG. 4. is a screenshot of a program page of the user interface in accordance with a preferred embodiment of the present invention.

Referring to FIG. 4, the program page of the user interface according to an embodiment of the present invention is shown. This page provides users with a listing of pending reminders for the program as well as a table of product codes. The product code table shown is an example of a customized tool created for the specific program.

Figure 5:
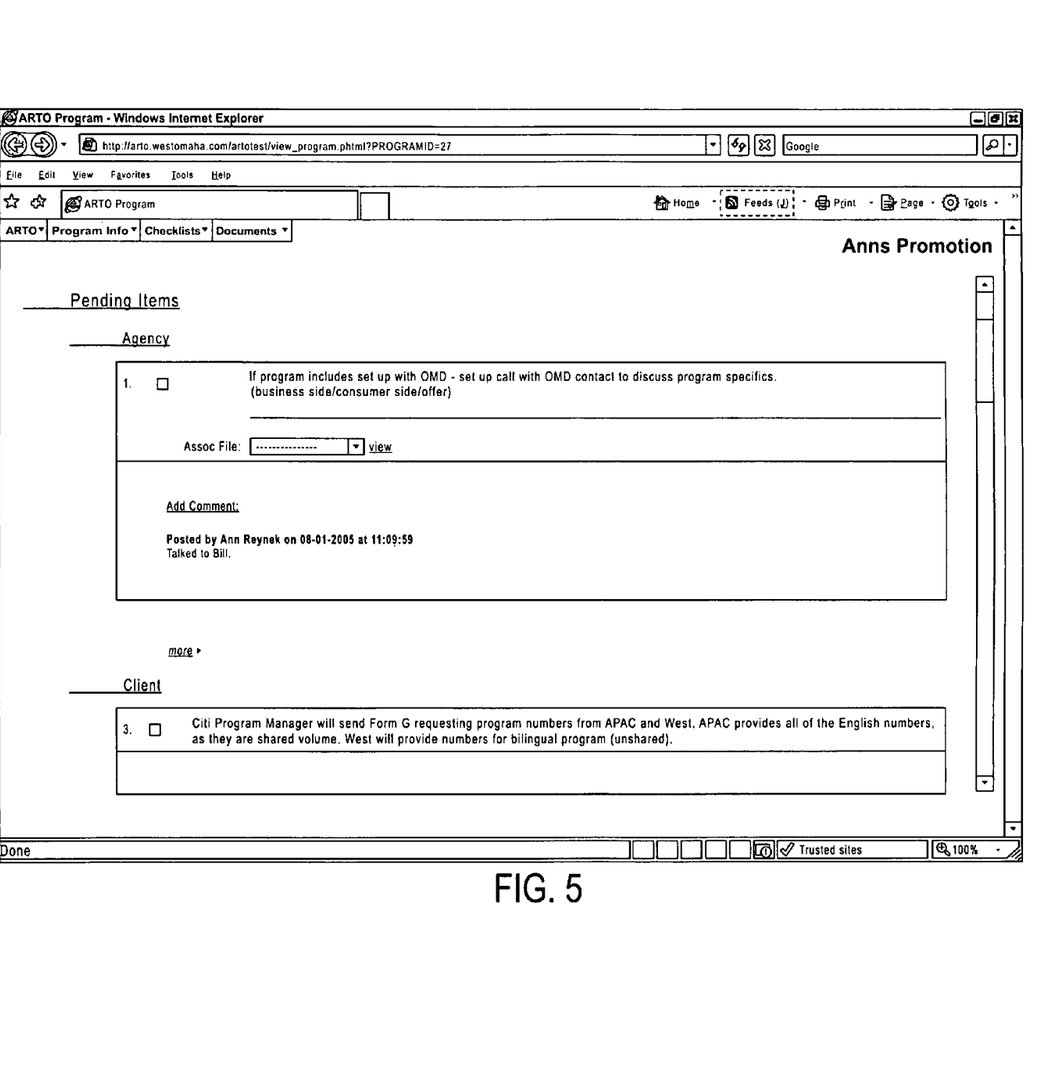
FIG. 5. is a screenshot of a checklist page of the user interface in accordance with a preferred embodiment of the present invention.

Referring to FIG. 5, the checklist page of the user interface according to an embodiment of the present invention is shown. The checklist page displays pending tasks for a given promotion to a user. From this page the user can modify checklists and add comments for tasks.

Figure 6:
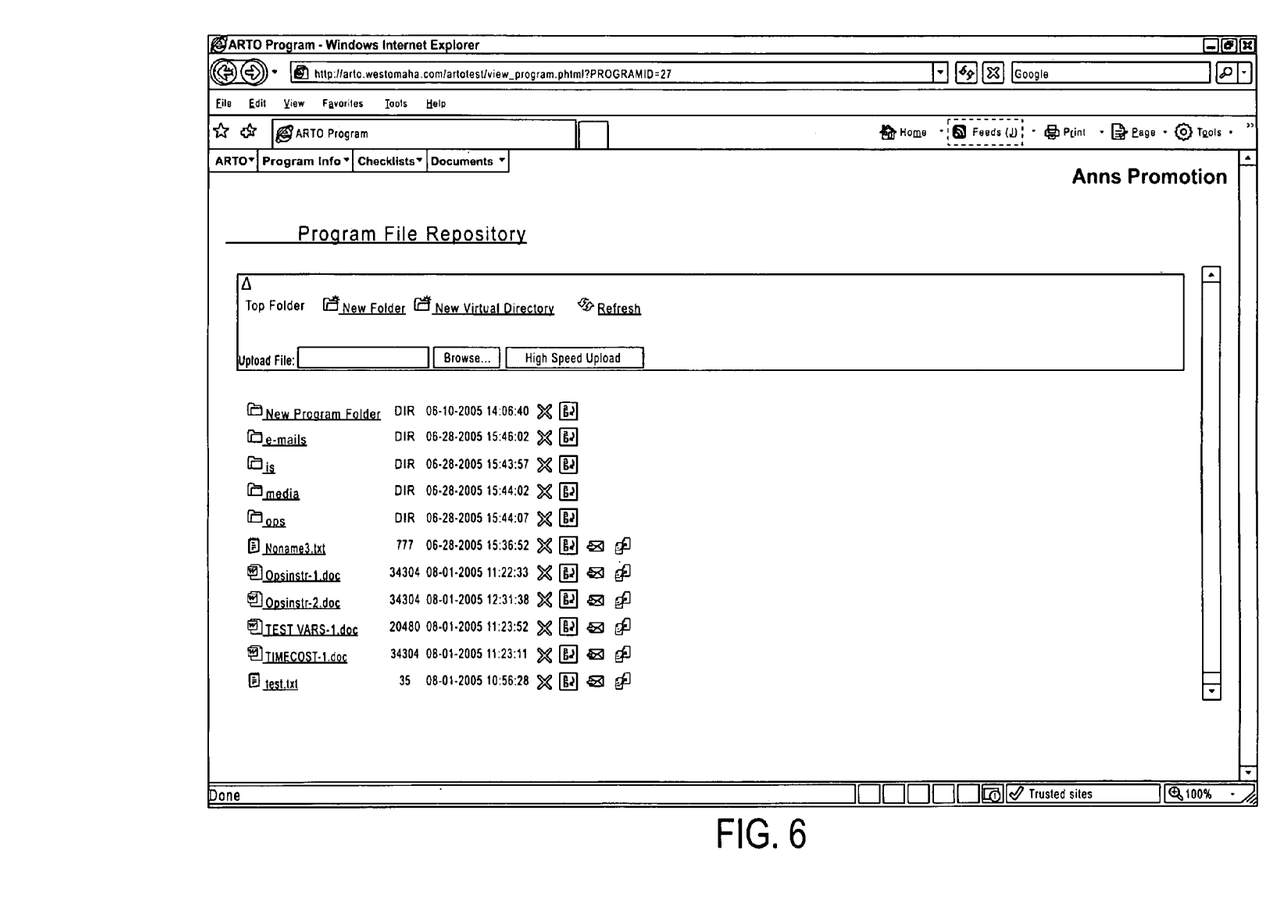
FIG. 6. is a screenshot of the program file repository page of the user interface in accordance with a preferred embodiment of the present invention.

Referring to FIG. 6, the program file repository page of the user interface according to an embodiment of the present invention is shown. This page provides the user with a graphical representation of the file storage unit structure including a view of the directories and files in the currently selected directory. By clicking on a directory, the user is able to navigate further through the file directory structure to view the contents of the directory. The user also has the option of manipulating the file repository by adding or deleting directories and uploading or deleting files. By selecting a file, the user can download or view the file's contents.

Figure 7:
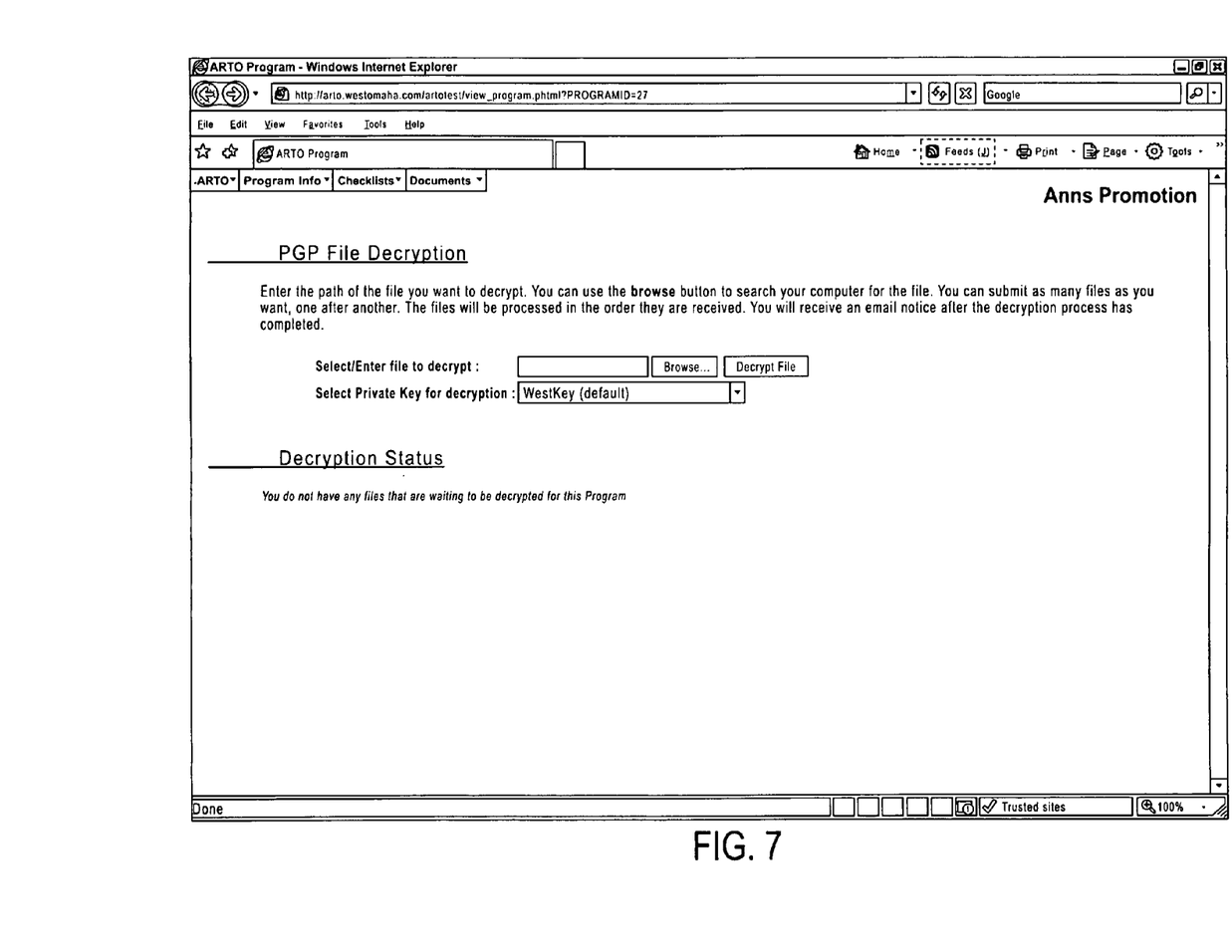
FIG. 7. is a screenshot of the decryption page of the user interface in accordance with a preferred embodiment of the present invention.

Referring to FIG. 7, the decryption page of the user interface according to an embodiment of the present invention is shown. The decryption page allows a user to select a previously encrypted file to decrypt with a chosen private key. Upon decryption, the user will be able to access the decrypted file.

Figure 8:
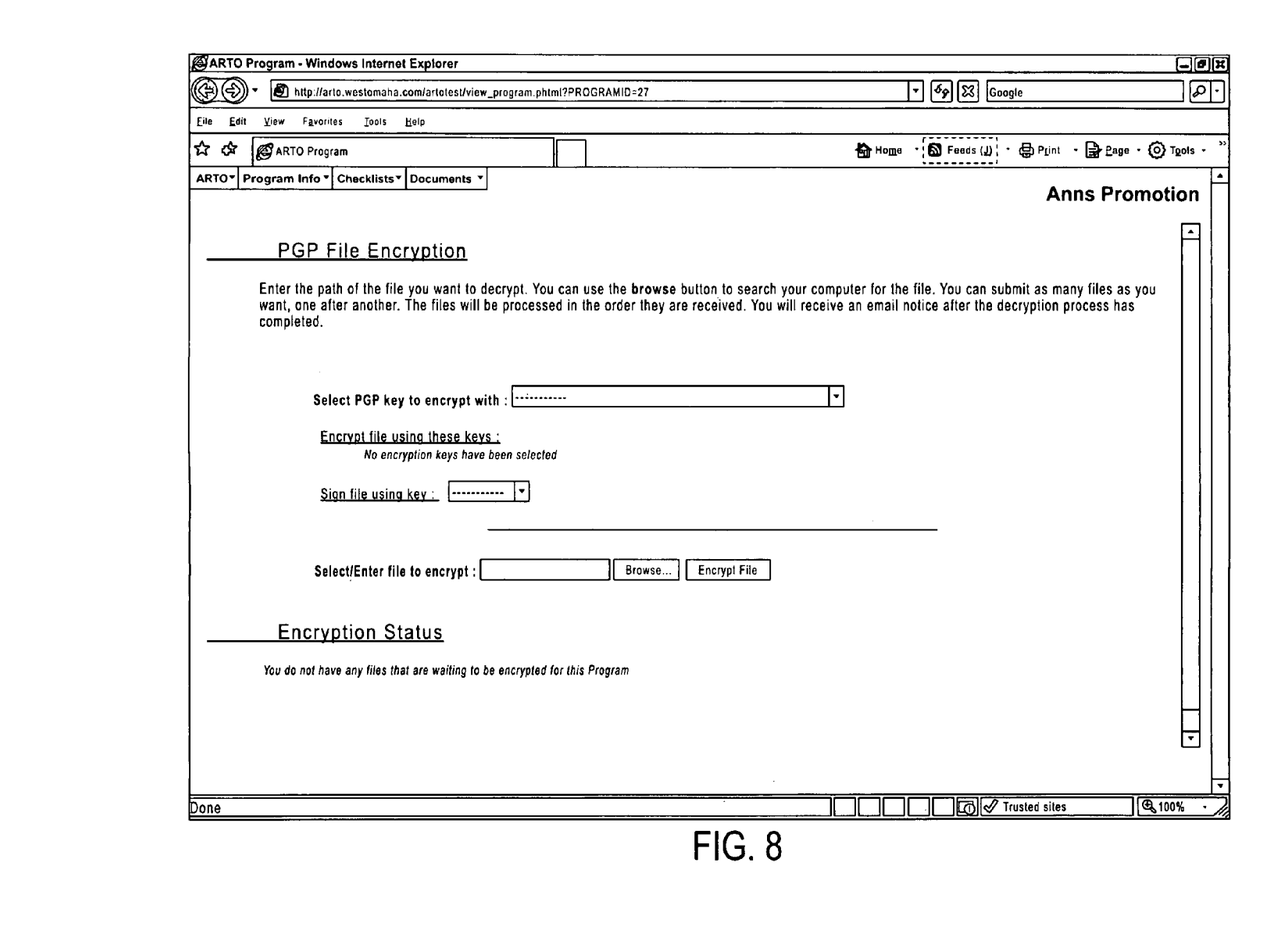
FIG. 8. is a screenshot of the encryption page of the user interface in accordance with a preferred embodiment of the present invention.

Referring to FIG. 8, the encryption page of the user interface according to an embodiment of the present invention is shown. Similarly to the decryption page, the encryption page allows a user to select a file and PGP encryption key with which to encrypt the file. Upon encryption, the user can securely transmit or store the file.

Figure 9:
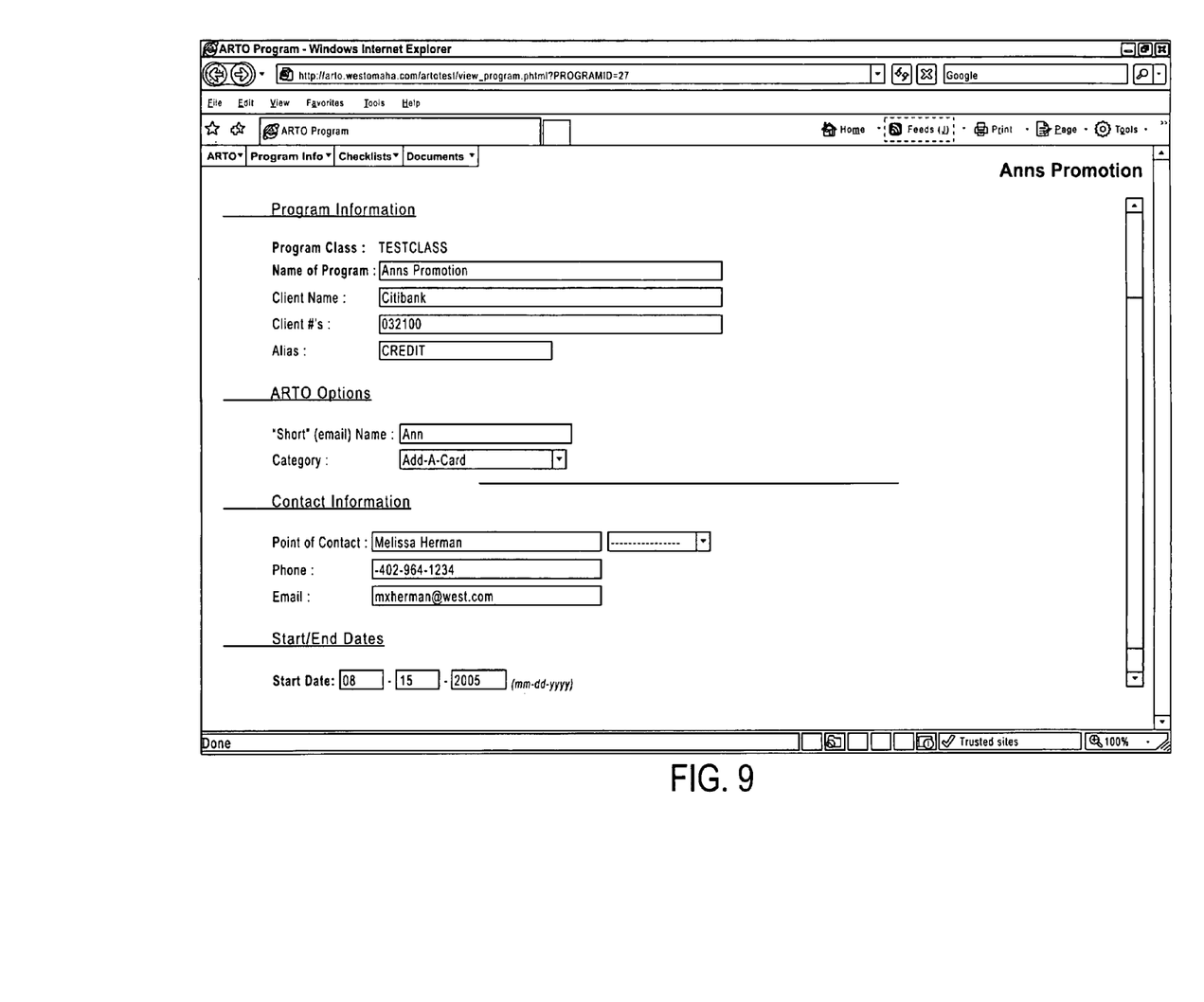
FIG. 9. is a screenshot of the program information setup page of the user interface in accordance with a preferred embodiment of the present invention.

Referring to FIG. 9, the program information setup page of the user interface according to an embodiment of the present invention is shown. This page allows a user to input client information and contact information for a program. This information includes program name, client name, client number, point of contact, phone number, and email address.

We claim:

1. A computer program embodied on a non-transitory computer readable medium, the computer program configured to manage client task information for one or more users, the computer program configured to:
    create one or more classes associated with a client, wherein each class comprises one or more programs; and
    create one or more checklists for each program, wherein each checklist comprises one or more tasks, wherein
    the one or more classes and the one or more programs constitute a two-tier hierarchical system of containers, where the class functions as a first tier of organization and the program functions as a second tier of organization.

2. The computer program of claim 1, further configured to create alerts for one or more tasks.

3. The computer program of claim 2, further configured to store files related to one or more checklists.

4. The computer program of claim 3, further configured to create and modify lists of contact information.

5. The computer program of claim 4, further configured to control user access to the computer program.

6. The computer program of claim 5, further configured to encrypt data in the computer program.

7. The computer program of claim 6, wherein the encryption algorithm used to encrypt the data is Pretty Good Privacy PGP.

8. The computer program of claim 6, wherein one or more of the stored files comprise email.

9. The computer program of claim 1, wherein the computer program is accessed by one or more users across a network.

10. A computer program embodied on a non-transitory computer readable medium, the computer program configured to manage client task information across a network with one or more users, the computer program configured to:
    create one or more classes associated with a client, wherein each class comprises one or more programs associated with a promotion of the client;
    set lists of tasks to be completed for the one or more programs;
    alert one or more users when a task is not completed by a given time;
    create and store template documents for the program;
    create directories of file storage units for the one or more programs, wherein each file storage unit holds electronic documents;
    input contact information into the program; and
    restrict users to levels of access to the computer program, wherein
    the one or more classes and the one or more programs constitute a two-tier hierarchical system of containers, where the class functions as a first tier of organization and the program functions as a second tier of organization.

11. The computer program of claim 10, wherein each of the one or more programs contains a set of required tasks.

12. The computer program of claim 10, further configured to fill the template documents with class and program information.

13. The computer program of claim 10, wherein the file storage units hold any of the following: electronic documents, scanned documents, template documents, and email.

14. The computer program of claim 10, wherein the highest level of access can modify anything and view anything, the middle level of access can modify some things and view anything, and the lowest level of access can modify nothing and view anything.

15. The computer program of claim 10, further configured to send information between account managers and clients.

16. The computer program of claim 10, wherein the information sent between account managers and clients is encrypted using Pretty Good Privacy (PGP) before sending and decrypted when received.

17. A computer-implemented method for managing client task information across a network with one or more users executed by a computer program embodied on a non-transitory computer readable medium, comprising:
    creating one or more classes associated with a client;
    creating one or more programs associated with a client's promotion;
    setting lists of tasks to be completed for the program;
    alerting one or more users when a task is not completed by a given time;
    creating and storing template documents for the program;
    creating directories of file storage units for the program;
    uploading at least one electronic document to at least one file storage unit;
    inputting contact information into the class; and
    providing levels of access to the computer program for one or more users, wherein
    the one or more classes and the one or more programs constitute a two-tier hierarchical system of containers, where the class functions as a first tier of organization and the program functions as a second tier of organization.

18. The computer-implemented method of claim 17, wherein a program comprises a set of required tasks.

19. The computer-implemented method of claim 17, further comprising:
    automatically filling the template documents with class and program information.

20. The computer-implemented method of claim 17, wherein the file storage units hold any of the following: electronic documents, scanned documents, template documents, and email.

21. The computer-implemented method of claim 17, wherein the highest level of access can modify anything and view anything, the middle level of access can modify some things and view anything, and the lowest level of access can modify nothing and view anything.

22. The computer-implemented method of claim 17, further comprising:

sending information between account managers and clients.

23. The computer-implemented method of claim 17, wherein the information sent between account managers and clients is encrypted using Pretty Good Privacy (PGP) before sending and decrypted when received.

* * * * *